March 1, 1960     N. J. SMITH     2,927,300
CANCELLATION OF SEISMIC SURFACE NOISE
Filed June 20, 1955     4 Sheets-Sheet 1

TRAVELING TRANSVERSE WAVE

INVENTOR
NEAL J. SMITH
BY
ATTORNEYS

STANDING TRANSVERSE WAVE

March 1, 1960 N. J. SMITH 2,927,300
CANCELLATION OF SEISMIC SURFACE NOISE
Filed June 20, 1955 4 Sheets-Sheet 4

INVENTOR
NEAL J. SMITH
BY
ATTORNEYS

United States Patent Office 2,927,300
Patented Mar. 1, 1960

2,927,300

CANCELLATION OF SEISMIC SURFACE NOISE

Neal J. Smith, Houston, Tex., assignor, by mesne assignments, to California Research Corporation, San Francisco, Calif., a corporation of Delaware Application June 20, 1955, Serial No. 516,422

3 Claims. (Cl. 340—15)

This invention relates in general to methods of seismic prospecting and relates more particularly to methods for eliminating extraneous energy in the seismic detector signals generated in such prospecting.

The seismic method of investigating the configuration of the rocks at depth below the earth's surface consists essentially of setting up an acoustic shock wave at or below the earth's surface by means of explosives or other suitable source of energy. Parts of this wave may be reflected or refracted back toward the surface of the earth from the interfaces of strata at depth and the times required for the wave to travel the reflected or refracted paths can be used to map the attitudes and depths of the subsurface strata when suitably reduced by standard computational procedures.

The reflected or refracted waves are detected at the surface by means of instruments known as vibration pick-ups or seismometers, instruments in which a resiliently supported mass is used as the reference body with respect to vibrations operating on the instrument case. Seismometers used in prospecting are usually polarized to respond only to vertical components of motion because it is mainly this type of motion that is produced at the surface by the steeply arriving waves of the acoustic type as they return from great depth. Some instruments are, less commonly, made to respond to horizontal translations or vibrations, and it will be quite apparent to anyone versed in vibration study that the methods and instrumentation to be described hereinbelow can be applied to this type of motion and instrument, but because the vertically polarized instruments are most common and because the method of this invention is expected to have greatest economic value when used in conjunction with these, this discussion will be primarily confined to vertically polarized seismometers.

In general, the modern seismometer converts the mechanical energy of earth or water motion into an electric signal which is then electronically amplified and viewed on an oscilloscope and/or recorded as a function of time by means of one of various types of recording oscillographs or reproducible recording devices. The reflected or refracted wave energy whose measure is desired is generally very small and requires instruments of high sensitivity and high magnification for satisfactory detection. Furthermore, the earth's surface is often in motion due to wind and wave action, traffic, pulsations from heavy machinery and to unwanted forms of wave motion generated by and radiating out from the explosion. When this extraneous energy is of the order of magnitude of the desired signal, interference results which diminishes the reliability of the data, and when, as is often the case, the extraneous energy is greater in magnitude than the desired signal, it may be impossible to recognize the reflected or refracted waves with any degree of certainty.

It would be a boon to the seismic exploration industry and to any industry or group interested in the study of and to attenuating or eliminating the influence of these surface noises from the electric signals generated by the seismometer, provided this could be done without prejudice to the reflected or refracted type wave energy. This would permit operations in places not now considered siutable for seismic prospecting; it would permit operation under weather conditions of greater severity than are now tolerable; and it would permit the detection of deeper, hence weaker, wave arrivals. In the study of the theory of vibrations, it would permit the more certain separation of waves of mixed types for analysis, a factor of importance to many industries other than petroleum exploration.

The nature of the disturbing wave motion at the earth's surface is very complex and may include vertical, horizontal, and rotary components. Since we are considering only the influences acting upon vertically polarized seismometers, any horizontal components present will be ineffectual. The bulk of the remaining noise will be undulatory in character and will be of two types. The most prominent of these is the traveling, transverse surface wave which represents motion of the type characteristically shown by the wave action on the surface of an unconfined body of water. That is, the motion of a particle on the surface is up and down, but the wave progresses laterally over the surface in a direction at right angles to the direction of particle motion. The second type may be called the standing, or stationary, vertically polarized transverse surface wave. In this case particle motion is again perpendicular to the surface, but the wave does not progress across the surface. It is the type of motion shown by a vibrating membrane or a taut string when plucked.

It is proposed here to make use of the dual nature of transverse wave motion, either traveling or standing or both, to cancel its total effect. This will be done by playing the signal or signals generated by one type of motion against that generated by the other type. Because a surface vibrating to vertically arriving longitudinal wave motion (the reflected or refracted wave) has only one mode of motion, i.e., back and forth in the direction of travel, longitudinal wave motions arriving at the same time as transverse wave motions will be unaffected by the present method of transverse wave cancellation utilizing the dual nature of the undesired vibrations.

It is therefore an object of the present invention to provide improved methods for eliminating undesired components of seismic detector signals.

It is an additional object of the present invention to provide methods for eliminating or reducing the effects of transverse wave motion on the outputs of seismic wave detectors utilized in seismic prospecting.

It is a further object of this invention to provide methods for reducing or eliminating the effects of transverse wave motion on polarized seismic detectors by generating an auxiliary signal having an amplitude dependent upon a selected characteristic of the transverse wave motion and combining this auxiliary signal with the seismic detector signal.

It is an additional object of the present invention to provide methods for reducing or eliminating the effects of transverse wave motion of the earth on polarized seismic detectors by generating an auxiliary signal having an amplitude dependent upon the amplitude of a selected characteristic of the rotational component of earth motion resulting from the transverse wave motion and combining the auxiliary signal with the seismic detector signal to produce the desired cancellation.

Objects and advantages other than those set forth above will be apparent from the following description when read in connection with the accompanying drawings, in which:

Fig. 1 is a graph illustrating a typical case of traveling transverse wave motion.

Fig. 2 diagrammatically illustrates an arrangement of seismometers and associated equipment for cancelling the effects of a traveling transverse wave on a vertically polarized translation seismometer.

Fig. 3 is a graph illustrating a typical example of a standing transverse wave.

Fig. 4 diagrammatically illustrates an arrangement of translation and torsion seismometers for simultaneously reducing or eliminating the effects of traveling transverse wave motion and standing transverse wave motion when these wave motions are at substantially right angles to each other.

Fig. 5 diagrammatically illustrates another arrangement of torsion and translation seismometers for simultaneously affecting both the traveling and standing transverse wave components.

Fig. 6 diagrammatically illustrates an arrangement utilizing a translation seismometer and a pair of torsion seismometers so oriented that the direction of transverse wave arrival bisects the angle between the planes of sensitivity of the torsion seismometers.

Fig. 7 diagrammatically illustrates an arrangement of seismometers and associated equipment in which the output of the torsion seismometer is modified by integration prior to being combined with the output of the translation seismometer.

Figure 1:
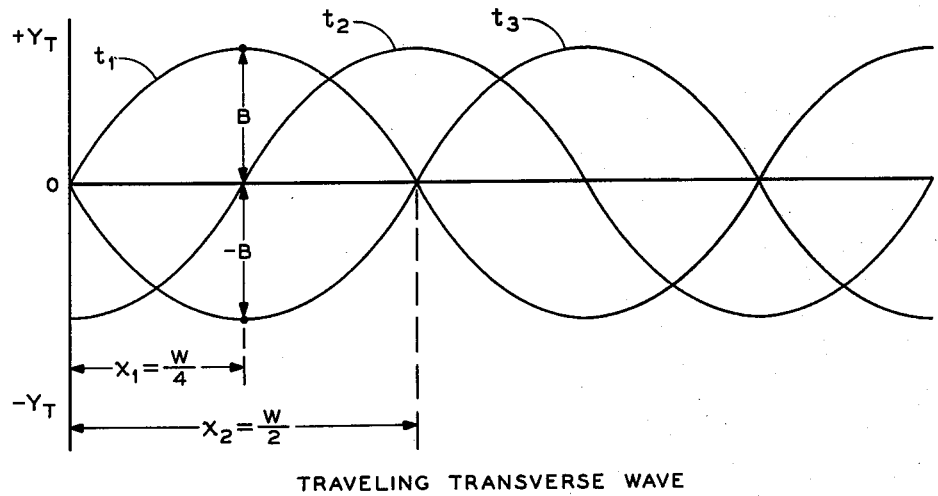

To illustrate the dual nature of traveling transverse wave motion, consider a chip floating on a water surface which is subject to wave action. The chip will move up and down in a translational motion with the water surface but, in the absence of wind or water current, will remain laterally in one spot. It is this up and down component of transverse surface wave motion which interferes with the detection of nearly vertically arriving reflected or refracted waves in seismic prospecting, because these latter waves also impose an up and down motion on the surface and the vertically polarized seismometer cannot distinguish between the motions from the two types of waves. The chip will also rotate or tilt from side to side as it rises and falls with the wave. The maximum tilt occurs at zero vertical displacement (mean surface level) of the wave and zero tilt occurs at time of crests and troughs of the wave.

It has been explained heretofore that the ordinary, vertically polarized seismometer responds to the translational component of the traveling transverse wave motion. If a torsion type seismometer, that is, one that responds to rotation rather than translation, is placed adjacent to the vertically polarized seismometer and is oriented so that its plane of reception is vertical and aligned with the direction of travel of the transverse surface wave, the torsion or angle sensitive seismometer will generate under the influence of the tilt tendency of the motion an electric signal very close in form to that generated by the vertically polarized seismometer acting under the up and down component of that same surface motion, provided neither instrument distorts the received wave through the superposition of its own vibration characteristics. This latter event can be prevented by suitable damping of the instruments or by keeping the natural frequencies of the instruments either well below or well above the lowest seismic frequencies of interest.

By appropriate choice of the type of transducer in the paired seismometers, generated wave forms will be produced which will either by 180° out of phase with each other or exactly in phase with each other. In either case, the pair of seismometers can be coupled electrically so that the respective electrical analogues of the ground motion will tend to cancel in the output circuit. As between a torsion seismometer and a translational seismometer, there will be proper pairing with respect to phase if the torsion meter responds to angular velocity while the translational meter responds to either displacement or acceleration. Alternatively, a torsion seismometer responding either to angle or angular acceleration can be paired with a translational seismometer responding to particle velocity. In other words, the instruments must be related through the time integral or derivative of the parameters being measured. If the instruments were matched as angular velocity meter to particle velocity meter, etc., the generated signals would be 90° out of phase and therefore not effective for cancellation.

The amplitudes of the electric signals generated by each type of instrument will not be equal. Where the amplitude factor required for exact matching is a constant, the problem is simple. The outputs of the torsion meter and the related translation type seismometer can be separately amplified by standard electronic amplifiers until the desired degree of matching has been achieved, so that subsequent addition or subtraction, as the case may be, will result in complete cancellation of all disturbing traveling transverse waves of whatever frequency. In fact, the degree of cancellation will generally be the criterion for the degree of amplitude matching.

On the other hand, where the amplitude factor is not a constant, but, as is the case with certain instrument pairings, is a function of frequency, the matching of amplitudes for cancellation is not so simple and requires additional instrumentation in the general case. This will be apparent in the following mathematical discussion. Let the vertical displacement of a particle in a surface subject to traveling transverse wave motion be:

(1) $\quad Y_T = B_T \sin 2\pi(ft - x/w)$ where $B_T$ is amplitude
$f$ is frequency in cycles per second
$t$ is time in seconds
$x$ is horizontal distance from point of origin
$w$ is wave length The wave surfaces in Fig. 1 conform to this equation where $Y$ is the ordinate, $x$ the abscissa, and the curves represent successive surface configurations at times $t_1$, $t_2$, and $t_3$, each a quarter time cycle apart. Seismometers responding to this type motion are called displacement seismometers. For the sake of brevity, this instrument will be designated by the letter $Y_T$.

Particle velocity in the vertical is:

(2) $\quad Y'_T = \Delta Y_T/\Delta t = (2\pi f B_T) \cos 2\pi(ft - x/w)$ and seismometers responding to this type of motion are velocity meters.

Particle acceleration in the vertical is:

(3) $\quad Y''_T = \Delta^2 Y_T/\Delta t^2 = -(2\pi f)^2 B_T \sin 2\pi(ft - x/w)$ Seismometers responding to this parameter are accelerometers and this type will be further designated by the symbol $Y''_T$. Now, the slope or tangent to the surfaces indicated in Fig. 1 and via Equation 1 is:

(4a) $\quad \Delta Y_T/dx = -(2\pi B_T/w) \cos 2\pi(ft - x/w)$ for any particular time $t_1$ $\quad =\tan A$ where $A$ is the angle of divergence from the horizontal But for very small angles such as obtained in this problem $\tan A$ is approximately equal to $A$ where $A$ is measured in radians.

Hence, (4b) $\quad A_T = -(2\pi B/w) \cos 2\pi(ft - x/w)$

Angle sensitive or torsion type seismometers responding to tilt from the horizontal will be designated by the letter $A_T$ in the discussion of traveling transverse waves.

Angular velocity will be (5a) $\quad A'_T = \Delta A_T/\Delta t - (2\pi)^2 fB/w \sin 2\pi(ft - x/w)$ or, recalling that velocity of wave travel, $V$, is equal to wave length times the frequency, i.e. to $fw$, Equation 5a can be written, (5b) $\quad A'_T = (2\pi f)^2 B/V \sin 2\pi(ft - x/w)$ Instruments responding to angular velocity will be designated $A'_T$.

Angular acceleration can be described, (6) $\quad A''_T = \Delta^2 A_T / \Delta t^2 = (2\pi f)^3 B/V \cos 2\pi(ft - x/w)$ Angular accelerometers as seismometers will be designated $A''_T$. These equations show that proper matching as to phase is achieved between the following pairs: $Y_T$ and $A'_T$; $Y'_T$ and $A''_T$; $Y'_T$ and $A_T$; and $Y'''_T$ and $A'_T$.

If amplitudes as between members of these pairs are compared in ratio form it is found that (7) $\quad Y_T/A'_T = Y'_T/A''_T = V/(2\pi f)^2$ and (8) $\quad Y'_T/A_T = Y''_T/A'_T = V$ Any of the four groupings of pairs listed above can be used for cancellation, but the ratios indicated in Expression 8 above suggest that pairs $Y'_T$, $A_T$, and $Y''_T$, $A'_T$ will be preferable because their amplitude ratios are simply equal to V, the velocity of wave travel, which is constant for a given wave type and wave path. Thus the electric signals generated by members of these pairs will not only match in phase but will be similar geometrically so that, for instance, if the output of a $Y'_T$ seismometer is matched in amplitude against that from at $A_T$ type torsion seismometer by feeding each output through separately controlled amplifiers, the match will be exact for all component frequencies of the disturbing wave group. In consequence, when these signals are subtracted, complete cancellation of all traveling wave components in the selected plane will occur. Similarly, when the output signals from pairs of seismometers corresponding to $Y''_T$ and $A'_T$ are combined, completed cancellation of all component frequencies of the disturbing wave group will result.

On the other hand, from the ratios of Expression 7 above it is seen that pairs $Y_T$, $A'_T$ and $Y'_T$, $A''_T$ cannot be so easily used unless the disturbing energy has only one frequency or lies in a very narrow band of frequencies. This follows because the ratio of the amplitudes of members of each of these latter pairs are proportional to the square of the frequency. Suppose for instance that the disturbance contained two frequencies, with one frequency considerably higher than the other. If the higher frequency energy was matched for cancellation, the lower frequency energy would be undermatched; and if the lower energy was exactly matched, the higher frequency would be overmatched. That is, if the lower frequency energy had a frequency half that of the higher frequency energy and if the higher frequency energy was exactly matched for cancellation, the lower frequency energy would be only one-fourth matched, leaving three-fourths of the lower frequency energy uncancelled. If the lower frequency energy was matched exactly, then the higher frequency energy from the torsion meter would have an amplitude four times too large for exact cancellation and would consequently leave on the record three times more unwanted interference of that frequency than would have been present due to the translation seismometer alone.

In practice these disadvantages may be more apparent than real. For instance, if the high frequency band is matched for cancellation, the low frequency band will at least be partially attenuated and, further, may lie below the frequency level of the reflected or refracted wave energy. In this latter instance, the uncancelled portion can be further cut down through the use of low cut-off filters normally available on standard seismic recording equipment. Similarly, if the low frequency band lies in the band of useful reflected or refracted frequencies, the higher frequency energy may be sufficiently above this band to permit attenuation through the use of the high cut-off filters which are normally available on standard seismic recording units. For use in the general case, the output from the torsion seismometer could be passed through a filter system having a frequency discrimination approximately proportional to $1/f^2$, so that the amplitude matching would be effective regardless of frequency. Such a filter system can be constructed without great trouble but, of course, represents a complication to achieve the same end which the pairings suggested by Expression 8 do not require. These latter pairings, then, namely $Y'_T$, $A_T$ and $Y''_T$, $A'_T$ are the preferred pairs for the cancellation of the traveling transverse wave energy.

Figure 2:
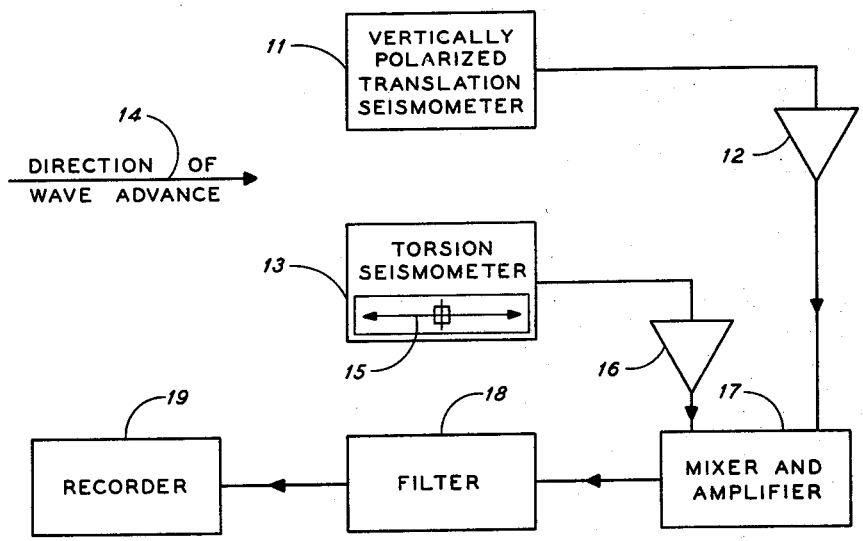

Fig. 2 shows the plan of instrument arrangement and the kinds of auxiliary apparatus needed for cancellation of the traveling transverse wave provided either of the preferred pairs of seismometers are used. The kinds of seismometers paired, the correct orientation of the torsion type and the two preliminary amplification stages for matching the respective seismometer signals are the only features of this plan not common to seismic prospecting apparatus in general. In Fig. 2, reference character 11 designates a conventional vertically polarized translation seismometer which is disposed on or below the surface of the earth and whose output is supplied to an amplifier 12. A torsion seismometer generally designated 13 is disposed adjacent translation seismometer 11 for designating the amplitude of the rotation or tilt motion of the surface. Arrow 14 designates the direction of advance of the traveling transverse wave of interest, and torsion seismometer 13 is so oriented relative to the direction of advance as to be responsive only to the rotation or tilt component of the transverse wave motion. In the particular instance illustrated in Fig. 2, the plane of action of seismometer 13 is in the plane of the paper and seismometer 13 responds to any tilting of this plane in the direction of the arrows 15 shown within seismometer 13. The output signal from seismometer 13 is supplied through an amplifier 16 to one input channel of a mixing and amplifying network 17. Network 17 is also connected to amplifier 12, and the signal from translation seismometer 11 and torsion seismometer 13 are combined in network 17 to produce the desired reduction or cancellation of the traveling transverse wave component, the exact nature of the combining operation depending on the types of seismometer utilized, as discussed above. The output from network 17 is supplied through a filter network 18 to a recorder 19 for producing a record of the resultant signal.

It will be apparent to one versed in the use of modern seismic equipment that the first practical step in using the plan of Fig. 2 and subsequent plans involving traveling wave cancellation will be to calibrate the matched seismometers so that the relative degrees of preliminary amplification for effective cancellation are known. If the instrument constants do not change with time this relationship will remain constant from one field set-up to another so long as the orientation of the torsion meter with respect to arriving wave remains constant. In the field it may not be possible to keep the orientation exactly parallel to the direction of wave advance; hence, minor adjustments on these preliminary amplification channels may be a practical necessity after moving from one set-up to another. The desired adjustment will be that for which the recording galvanometers or other suitable current or potential measuring device indicate a minimum disturbance due to traveling transverse wave motion.

The above examples relate specifically to the reduction or cancellation of the effects of traveling transverse waves, but the present invention may also be applied to the elimination of the effects of standing transverse waves. Standing or stationary waves are the type set up in a body in resonance or under the influence of a sustained source of vibration. The motion in a drum-head, of a violin string, or the floor, walls, etc., of a building in which unbalanced machinery is operated are typical examples of transverse standing wave motion. These waves do not progress along the surface but oscillate in place with more or less stationary nodes and loops. Because of the high damping characteristics of the earth's surface and the usual absence of sustained vibration sources of the requisite frequencies, this type of wave motion will be of less importance, generally, in seismic prospecting than the traveling wave. Nevertheless, there will be places and occasions where it is dominant.

Figure 3:
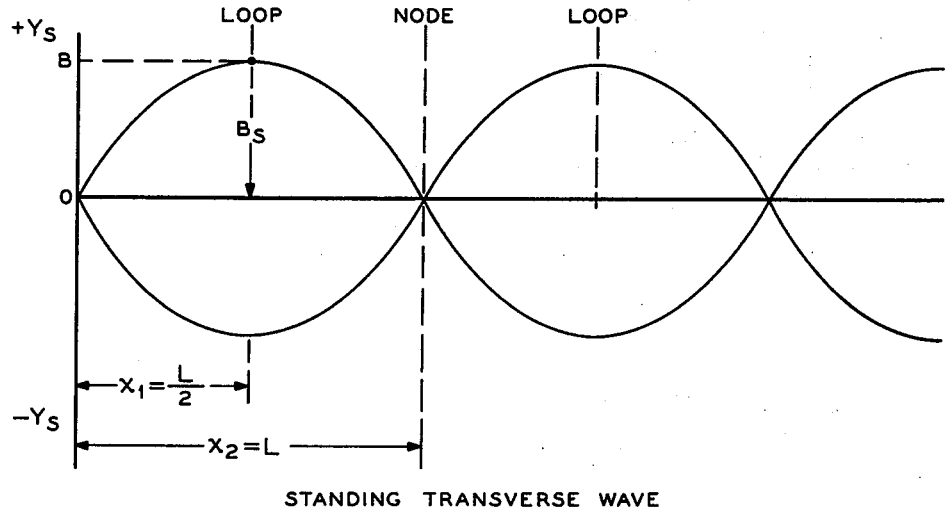

Referring to Fig. 3, there is shown an example of a surface which is subject to transverse standing waves. The three positions of the surface shown in Fig. 3 represent times a quarter cycle apart. Note that at the nodes, i.e., at $x=0$, L, 2L, etc., there is no vertical particle displacement at any time but that this is the point where maximum tilt occurs. Conversely, at the loops, i.e., at $x=L/2$, $3L/2$, $5L/2$, etc., maximum displacement occurs periodically but tilt is zero (the tangent to the surface remains horizontal with time). These features can be discussed mathematically as follows:

Let the equation for standing wave displacement in the vertical be, (9) $\qquad Y_s = B(\sin \pi x/L)(\sin 2\pi ft)$ where $Y_s$ is particle displacement
B is amplitude
$x$ is horizontal distance, measured from nodal origin
L is distance between nodes
$f$ is frequency
$t$ is time The particle velocity is,

(10) $\qquad Y'_s = \Delta Y_s/\Delta t = 2\pi fB \sin \pi x/L \cos 2\pi ft$ and particle acceleration is,

(11) $\qquad Y''_s = \Delta^2 Y_s/\Delta t^2 = -(2\pi f)^2 B \sin \pi x/L \sin 2\pi ft$ The slope of the surface at a particular time is, (12a) $\qquad \Delta Y_s/\Delta x = (\pi B/L) \cos \pi x/L \sin 2\pi ft$
$\qquad = \tan A$ But for small angles such as those dealt with here, tan A is approximately equal to A where the angle is measured in radians. Hence, (12b) $\qquad A_s = (\pi B/L) \cos \pi x/L \sin 2\pi ft$ This is the equation for the motion produced by a tilt meter in response to standing wave motion, provided the meter is oriented so that its plane of action contains the plane of maximum vibratory motion.

Angular velocity can be expressed,

(13) $\qquad A'_s = \Delta A_s/\Delta t = (2\pi^2 Bf/L) \cos \pi x/L \cos 2\pi ft$ and angular acceleration as,

(14) $\qquad A''_s = \Delta^2 A/\Delta t^2 = (4\pi^3 f^2 B/L) \cos \pi x/L \sin 2\pi ft$ Now in comparing expressions for $Y_s$, $Y'_s$, and $Y''_s$ for translatory motion against $A_s$, $A'_s$, and $A''_s$ for angular motion in the case of standing waves, significant and interesting differences appear in connection with pairs which are suitable for cancellation with respect to those pairs suitable for cancellation in the case of traveling waves. For the standing wave it is seen that there are five combinations (i.e. $Y_s$, $A_s$; $Y_s$, $A''_s$; $Y'_s$, $A'_s$; $Y''_s$, $A_s$; $Y''_s$, $A''_s$) between translatory and torsion instruments in which the electric analogue of the wave motion will be in phase or 180° out of phase with respect to time, as contrasted with four such suitable pairings for the traveling wave. Further, no combinations are suitable for both traveling and standing wave cancellation, i.e., additions between translatory and torsion type seismometers cannot be used directly to cancel both types of wave at the same time.

Pairs of torsion and translation type seismometers giving signals in phase are $Y_s$, $A_s$; $Y'_s$, $A'_s$; and $Y''_s$, $A''_s$ and the amplitude ratios for these pairs are,

(15) $\qquad Y_s/A_s = Y'_s/A'_s = Y''_s/A''_s = \dfrac{(L/\pi)(\sin \pi x/L)}{\cos \pi x/L}$ $\qquad = (L/\pi) \tan \pi x/L$ Pairs giving signals 180° out of phase are $Y_s$, $A''_s$ and $L''_s$, $A_s$, and these have respective amplitude ratios of, (16a) $\qquad Y_s/A''_s = \dfrac{(L/4\pi^3 f^2)(\sin \pi x/L)}{\cos \pi x/L} = -(L/4\pi^3 f^2) \tan \pi x/L$ and (16b) $\qquad Y''_s/A_s = -(4L\pi f^2) \tan \pi x/L$ Expression 15 deals with pairs that have amplitude ratios directly proportional to L, the distance between nodes or loops. But since L is inversely proportional to frequency for vibrations harmonically related, as this type will be, the amplitude ratios are actually inversely proportional to the first power of the frequency. By this same logic, the ratio of Expression 16a, $Y_s/A''_s$, shows amplitudes varying inversely as the cube of the frequency, and the ratio of Expression 16b, $Y''_s/A_s$, shows amplitude varying directly as the first power of frequency. Pairs $Y_s$, $A_s$; $Y'_s$, $A'_s$; $Y''_s$, $A''_s$; and $Y''_s$, $A_s$ have the simplest amplitude ratios with respect to frequency and are therefore the logical ones to utilize in canceling standing wave energy. The pair $Y_s$ and $A''_s$ can be used, but would require more complicated auxiliary equipment in order to effectively cancel more than one disturbing frequency at the same time.

If a single frequency is dominant, as may often be the case, an instrument sequence similar to that shown in Fig. 2 may be sufficient, with the torsion seismometer properly oriented in the plane of the transverse standing wave, as will be discussed further hereinbelow. However, if several frequencies are involved, it will be necessary to subject the outputs of the torsion seismometers, either before or after primary amplification, to wave filters discriminating against increasing frequency in a linear manner at a rate of 6 decibels per octave for the pairs of seismometers listed in Expression 15. Of course, the same effect could be obtained by applying the reverse of this filtering to the respective translation seismometer outputs prior to addition to or subtraction from the unfiltered torsion seismometer signals.

It is possible to eliminate the need for frequency discriminating filters over a range of one harmonic on either side of a given frequency by combining one of the pairs of Expression 15 with the pair of Expression 16b, since the ratios of the amplitudes of Expression 15 are inversely proportional to frequency while the ratio of the amplitudes of the pair of Expression 16b is directly proportional; hence, over a moderate region, the influence of frequency is partially cancelled. For such a purpose the combination $Y''_s$, $A''_s$ plus $Y''_s$, $A_s$ would seem preferable, since only a single translation seismometer would be needed. The amplitude ratio for the combination would be,

(17) $\qquad (A''-A)/Y''_s = P(C\pi f + K/4\pi f) \cot \pi x/L$ where P, C, and K are proportionality constants due to physical properties of the ground and instrument characteristics.

An arrangement similar to that shown in Fig. 2 with the torsion seismometer properly oriented with respect to the plane of arrival of the stationary transverse wave and with the torsion seismometer and its paired translation seismometer located at a point equidistant between a loop and a node of the standing wave, will produce cancellation of a standing wave having a single dominant frequency. Such an arrangement would also be partially effective in cancelling the first odd harmonics should one be active, i.e., a component having a frequency either three times or one-third that of the dominant. However, this arrangement will cancel none of the higher even harmonics. In order to begin cancelling the even harmonics, the ground positions of the pair of seismometers should be moved toward either dominant loop or node.

It is obvious that for different positions between loop and node the amplitude ratios change (as shown by Formulae 15 and 16), requiring differing preliminary amplifications of each seismometer for proper matching. Toward the loop, the translation seismometer puts out a stronger relative signal prior to amplification and toward the node the opposite occurs. This behavior regarding amplitude ratios is in contrast to that for pairs used in cancelling traveling waves, where so long as the orientation is constant, amplitude ratios remain unchanged for different ground positions. The amplitude ratios for standing wave cancellation are also functions of orientation, there being zero tilt tendency in directions at right angles to lineups of loops and nodes.

In the event that traveling transverse and standing transverse waves are simultaneously present to the extent that both are producing noticeable interference with reflected and refracted wave energy, cancellation is possible through the following expedients. When the traveling wave motion and standing wave motion are at or nearly at right angles to each other, a torsion seismometer and a translatory seismometer paired and oriented for cancellation of the traveling wave will also be relieved of the influence of a particular standing wave if the pair of seismometers is located at the nodal point of the standing wave. This follows because at this point the standing wave has no up and down component to affect the translatory seismometer and likewise has no component of tilt in the plane of action of the torsionmeter. The effects at this position of standing waves which are even, higher harmonics of the particular standing wave will also be eliminated, provided their planes of effective motion remain at right angles, or nearly so, to the direction of traveling wave advance.

Figure 4:
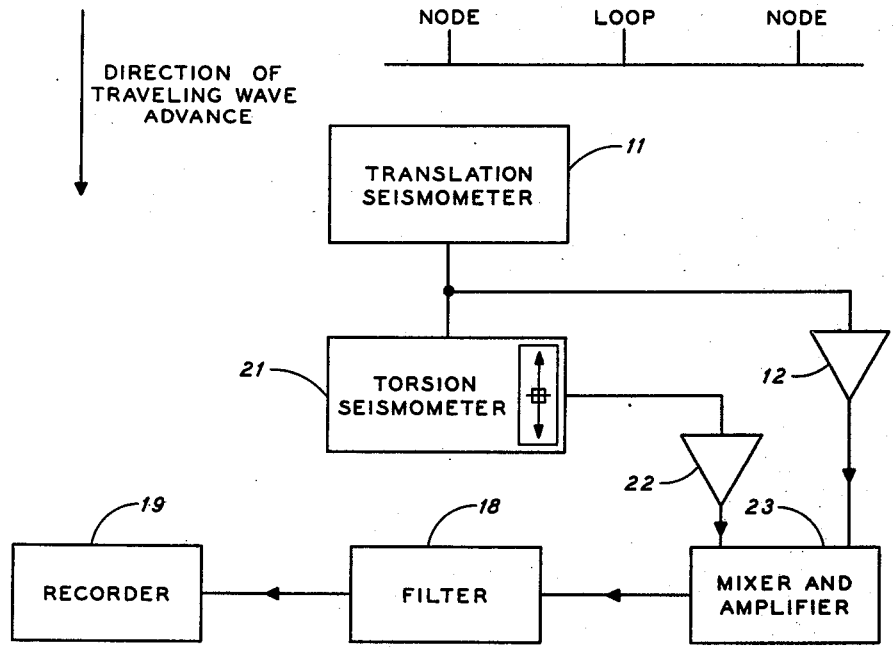

An arrangement suitable for such a method of cancellation is shown in Fig. 4, in which reference character 11 again designates a conventional vertically polarized translation seismometer. A torsion seismometer 21 is disposed adjacent seismometer 11, and both are positioned on one of the nodal points of the standing wave. The plane of action of the torsion seismometer 21 is that of the paper and its direction of orientation is that indicated by the arrows, so that seismometer 21 is insensitive to the tilting component produced by the standing wave. The output from seismometer 21 is supplied through an amplifier 22 to a mixing and amplifying network 23 where it is combined with the translation seismometer signal from amplifier 12 and seismometer 11.

Cancellation in this case can also be obtained between a first torsion seismometer and a translatory seismometer paired and oriented for traveling transverse wave cancellation, and a second torsion meter paired with the same translatory seismometer and oriented to receive the standing wave tilt. By separately adjusting the amplitudes of the three seismometer outputs prior to combining their signals, there will be cancellation of both wave types, provided the ground location with respect to standing wave loops and nodes is selected as discussed above.

Figure 5:
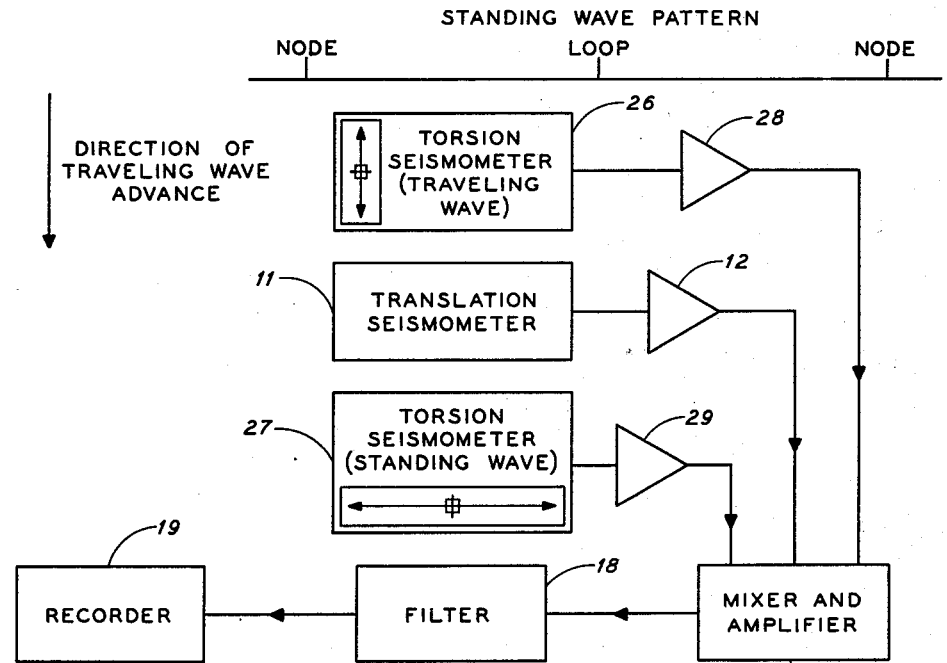

Equipment suitable for carrying out such a method is shown in Fig. 5 where reference numeral 26 designates a first torsion seismometer responsive to the traveling transverse wave component and having its plane of action in the direction indicated by the arrows. An additional torsion seismometer 27 is provided to sense the standing wave component of motion, and this seismometer has its plane of action in the direction indicated by the arrows. The outputs from seismometers 26 and 27 are supplied through amplifiers 28 and 29, respectively, to a mixing network 31 where they are combined with the signal from translation seismometer 11.

Figure 6:
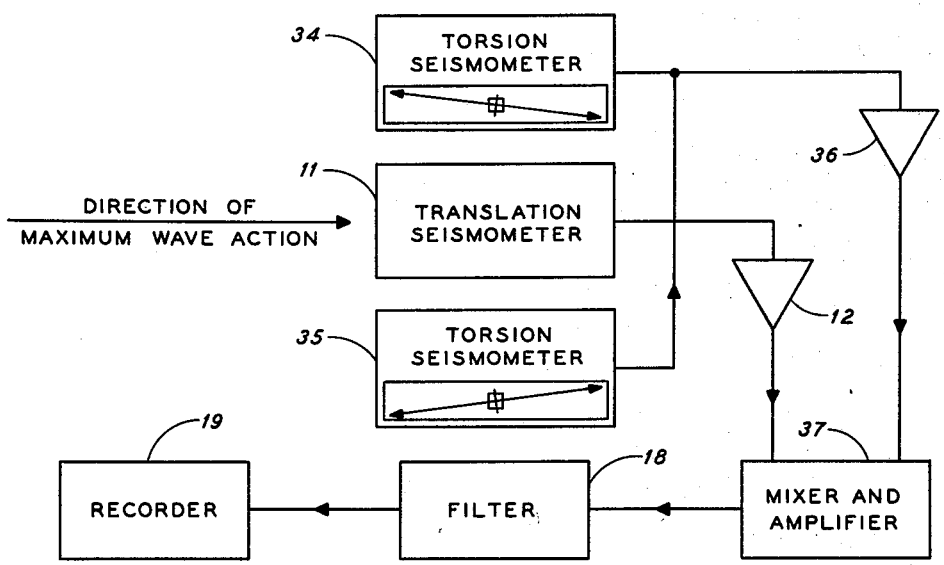

An improvement over the single torsion seismometer paired to the translation seismometer for traveling transverse wave cancellation would be the linking of two torsion seismometers to one translation seismometer, each of the torsion instruments having its plane of action at an angle to the other. If the instruments are oriented so that the angle is approximately bisected by the direction of traveling transverse wave approach, then subsequent changes in the direction of the wave could be tolerated without serious prejudice to the relative outputs of torsion seismometers with respect to output of the translational seismometer, hence better cancellation will result at a given setup. The same benefits would flow in the case of a standing wave which might change its direction of action during the period of recording. Equipment for carrying out this method is shown in Fig. 6 where reference numerals 34 and 35 designate a pair of torsion seismometers which are so oriented, as indicated by the arrows, that the direction of wave advance approximately bisects the angle between their planes of action. The outputs from seismometers 34 and 35 are supplied jointly through an amplifier 36 to a mixing network 37 where they are combined with the output from translation seismometer 11. It is understood that the two torsion instruments 34 and 35 have equal sensitivities and combine their outputs for cancellation against the component from the translation seismometer. The size of the angle selected would not ordinarily be greater than 90° and could be smaller if only small variations in the direction of arrival of the waves were anticipated. The use of the arrangement shown in Fig. 6 makes determination of the precise direction of wave action or travel less critical and thus serves to cut down the time required for setting up in the field.

In the preceding discussion, it was pointed out that certain pairs of seismometers were most suitable for use in the present invention, since their outputs inherently had the required phase relationships for proper cancellation. However, it will be obvious to those skilled in the art that the outputs of pairs of seismometers which do not inherently have the required phase characteristics may be modified by suitable differentiating or integrating networks to produce the desired phase relationships.

Figure 7:
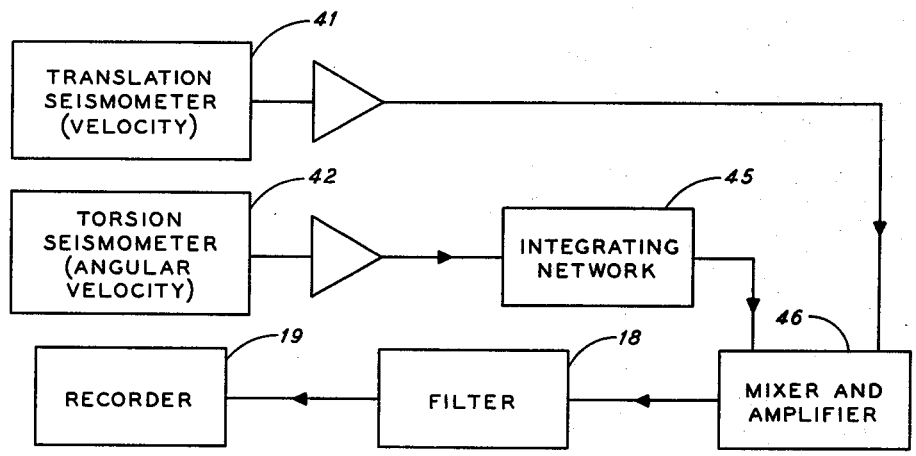

Fig. 7 illustrates one such arrangement in which a translation seismometer 41 responsive to particle velocity is paired with a torsion seismometer 42 responsive to angular velocity. The unmodified outputs of these two instruments are not suitable for combination because they are ninety degrees apart in phase, but by passing the output from torsion seismometer 42 through an integrating network 45, a ninety degree phase shift is effected to produce the required phase relationship. The outputs from seismometer 41 and integrating network 45 may then be properly combined in a mixer network 46. Of course, the same end result could be achieved by passing the output of seismometer 41 through a differentiating network to produce a ninety degree phase shift. From the above example, it will be apparent that other pairs of output signals may be similarly modified by integration or differentiation to produce the required phase relationships.

The outputs of torsion meters are inversely proportional to the velocity of the transverse wave, and since the velocity of the wave may vary during the seismic disturbance, the amplitude of the torsion meter output may consequently vary from this cause during the disturbance. This problem may be solved by utilizing a knowledge of the velocity variations in the surveyed area to program the action of a preset gain control of the amplifiers so that increases or decreases in the torsion meter output resulting from variations in wave velocity are compensated, resulting in uniform cancellation throughout the disturbance.

Figure 8:
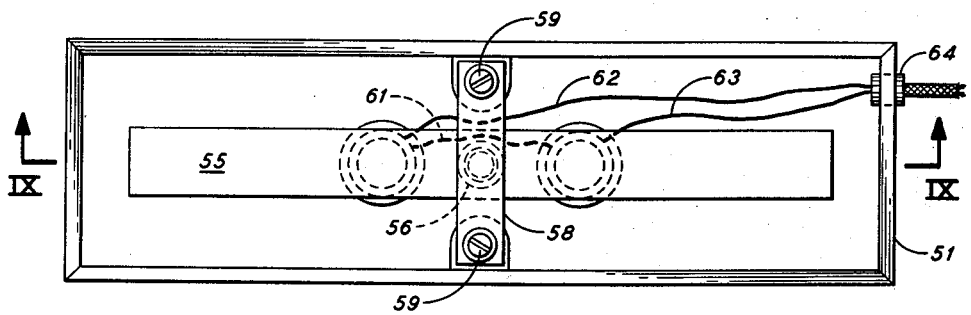
Fig. 8 is a plan view of a representative type of torsion seismometer suitable for use in the present invention.
Figure 9:
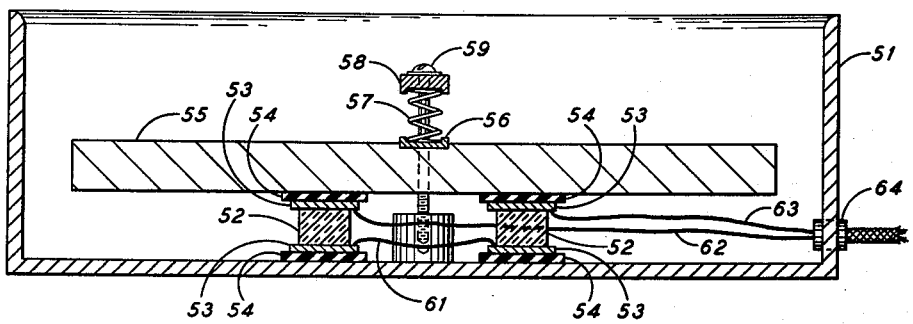
Fig. 9 is a sectional view taken along plane IX—IX of Fig. 8.

Any suitable types of torsion meters having the required sensitivity may be utilized in the present invention. For example, displacement seismometers of the capacitance or photoelectric types; velocity seismometers of the reluctance or inductance type; and accelerometers of the reluctance, inductance, piezoelectric or magnetostrictive type, are all suitable in the method of the present invention. Figs. 8 and 9 illustrate one type of angular or torsional accelerometer which can be used as a seismometer sensitive to angular accelerations due to tilt but which is not sensitive to forces of translation. It makes use of the piezoelectric properties of certain crystals such as quartz or Rochelle salts or of barium titanate. Alternatively, magnetostrictive elements could be utilized as the electromechanical transducers, with equivalent results. In the design shown in Figs. 8 and 9, torsional forces acting on the seismometer case parallel to the direction of elongation of the mass produce an additive electromotive force in the coupled piezoelectric crystals which may be fed through a preamplifier and thence led to proper auxiliary equipment where it is recorded as the analogue of the torsional component of ground motion acceleration.

In Figs. 8 and 9, the seismometer includes a case 51 containing a pair of oriented piezoelectric crystals 52. Each crystal 52 is disposed between a pair of contact plates 53 which are in turn located between pairs of nonconducting plates 54. Balanced across the crystal units is a bar mass 55 upon which rests a pressure plate 56. Plate 56 exerts a clamping pressure on mass 55 and thence against the crystal units by virtue of a spring 57 compressed between plate 56 and a clamping bar 58. A pair of screws 59 extending through bar 58 to two lugs are provided to permit adjustment of the pressure exerted by spring 57 on bar mass 55 and crystals 52. Spring 57 has a stiffness such that the natural frequency of the system is much higher than the highest frequency of ground motion that will be experienced.

The bottom contact plates 53 of the crystals are connected together by an insulated conductor 61 and the top contact plates 53 are each connected by insulated conductors 62 and 63, respectively, to different terminals of a connector plug 64. Since the crystals have similar piezoelectric orientations, and since the crystals are assumed to be equal in size and sensitivity, it will be understood that vertical forces of translation produce equal but opposite electromotive forces in each crystal, so that these electromotive forces cancel each other for vertical translation forces. Similar cancellation also results from translatory forces acting in any other direction and from rotational forces acting at right angles to the length of the mass, or in the horizontal plane. However, rotational force components acting in a vertical plane parallel to the length of mass 55 will produce compression in one crystal and expansion in the other crystal, and owing to the nature of the electrical connections of the crystals, the generated electromotive forces are combined to produce the desired output. For simplicity, single crystals were shown in Figs. 8 and 9, but it will be understood by those familiar with the art that stacks of crystals or properly coupled mosaics of crystals can be used for the purpose of increasing the signal amplitude.

In connection with the above-described examples, it was stated that it is desirable to know in advance the probable direction of wave advance or action so that the torsion seismometer or seismometers could be properly oriented with respect to this direction. However, the need for such orientation can be eliminated to a large extent through the use of rectification of the seismometer outputs prior to combining them. To devise a system which is equally sensitive to tilt from any direction, a radial array of torsion seismometers which are arranged about a vertical axis of symmetry could be utilized, with the outputs of each of the torsion seismometers separately rectified prior to addition. An array of six seismometers so arranged would give a maximum output difference due to variations in wave direction of less than 3 percent. Alternatively, each of the meters radially arranged in the above-described manner could include an electromechanical full wave rectifier so that the seismometer outputs could be combined directly. As an additional alternate, a single electromechanical torsion meter of the full wave rectifier type and having equal sensitivity in all directions could be utilized.

Other combinations of instruments, orientations and placements on the ground could be described as suitable for specific conditions, but it is believed that the cases likely to occur most frequently have been described above and that enough has been illustrated and described in regard to the manner of combining, etc., to demonstrate the flexibility of the system on the one hand and to indicate to one skilled in seismic prospecting how to approach the solution of undiscussed cases on the other.

In the discussion and the sketches of the particular cases the paired or otherwise matched seismometers are placed close together on the ground so as to occupy as nearly as possible essentially the same point of activity with respect to the wave or waves. Because of the difference in physical characteristics that can take place even over short distances on the ground it may be more practical to either place both or all matched seismometers on a common base such as a plank or metal plate which will in turn rest firmly on the ground, or to build the matched seismometers into a single housing.

Although but a few illustrative embodiments of the present invention have been described, it will be apparent to those skilled in the art that various changes and modifications may be made therein without departing from the spirit of the invention or the scope of the appended claims.

I claim:

1. Apparatus for reducing the effect of transverse wave motions in seismic prospecting comprising a vertically polarized seismic wave detector, a pair of torsion seismometers located adjacent said detector and having their axes of sensitivity to rotational forces at not over about 90° to each other and oriented with respect to the direction of said wave motion so as to be about equally responsive to rotational movement of the earth due to said transverse wave motions, means for combining a derivative of the output signal of said vertically polarized detector and a derivative of the output signal from each of said torsion seismometers, said derivative signals from said torsion seismometers being phase shifted so that one is 90° relative to said detector signal and the other is 180° relative to said detector signal, and means for recording said combined output signals.

2. Apparatus for reducing the effects of traveling and standing transverse wave motions in seismic prospecting comprising a vertically polarized seismic wave detector, a first torsion seismometer adjacent said detector and oriented so as to be responsive to the rotative component of said standing wave motion, a second torsion seismometer adjacent said detector and oriented so as to be responsive to the rotational component of said traveling wave motion, means for combining a second order derivative of the output signal of said vertically polarized detector, an even-order derivative of the output signal of said first torsion seismometer and an odd-order derivative of the output signal of said second torsion seismometer, and means for recording said combined output signals.

3. Apparatus for reducing the effect of traveling transverse wave motion in seismic prospecting comprising a vertically polarized seismic wave detector, a pair of torsion seismometers responsive to rotational movement of the earth's surface adjacent said detector, said torsion seismometers being oriented so that the direction of travel of said wave motion approximately bisects the angle between the planes of sensitivity of said torsion seismometers, means for combining a derivative of the output signal of said vertically polarized detector and an odd-order derivative of the output signals of both said torsion seismometers, means for adjusting the amplitudes of said derivative signals from said torsion seismometers to cancel the vertical components of motion due to said traveling transverse wave in said detector signal derivative, and means for recording said combined output signals.

References Cited in the file of this patent

UNITED STATES PATENTS

| | | |
|---|---|---|
| 2,184,313 | Owen | Dec. 26, 1939 |
| 2,215,297 | Owen | Sept. 17, 1940 |
| 2,257,187 | Owen | Sept. 30, 1941 |
| 2,331,624 | Parr | Oct. 12, 1943 |
| 2,390,187 | Sharpe | Dec. 4, 1945 |
| 2,657,373 | Piety | Oct. 27, 1953 |

UNITED STATES PATENT OFFICE

CERTIFICATE OF CORRECTION

Patent No. 2,927,300                          March 1, 1960

Neal J. Smith

It is hereby certified that error appears in the printed specification of the above numbered patent requiring correction and that the said Letters Patent should read as corrected below.

Column 3, line 67, for "either by" read -- either be --; column 5, line 30, for "from at" read -- from an --; column 8, line 9, for "$L''_s$" read -- $Y''_s$ --.

Signed and sealed this 11th day of October 1960.

(SEAL)
Attest:

KARL H. AXLINE
Attesting Officer

ROBERT C. WATSON
Commissioner of Patents